Sept. 9, 1969     T. H. KRUEGER     3,466,215
HAND TAPE DISPENSER TOOL
Filed Oct. 21, 1966     2 Sheets-Sheet 1
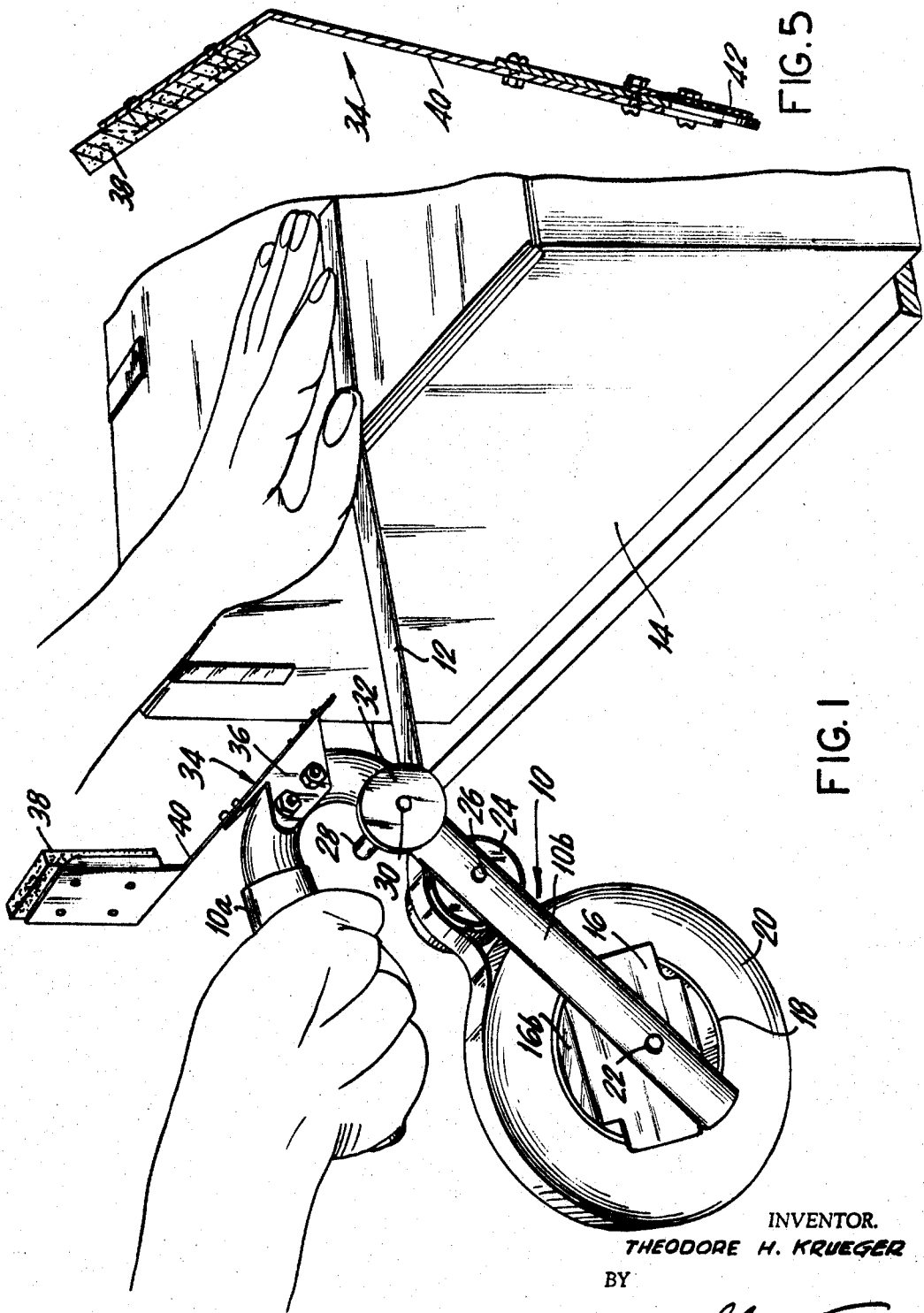
INVENTOR.
THEODORE H. KRUEGER
BY
*McGlew & Toren*
ATTORNEYS.

Sept. 9, 1969  T. H. KRUEGER  3,466,215
HAND TAPE DISPENSER TOOL
Filed Oct. 21, 1966  2 Sheets-Sheet 2
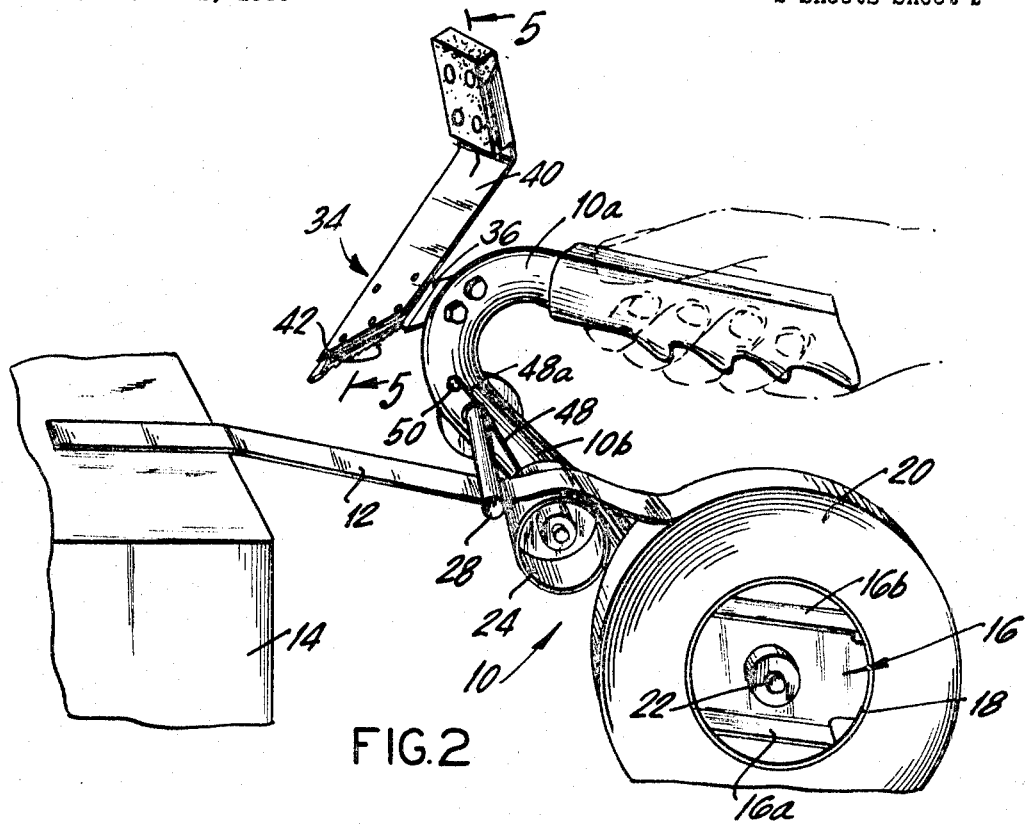
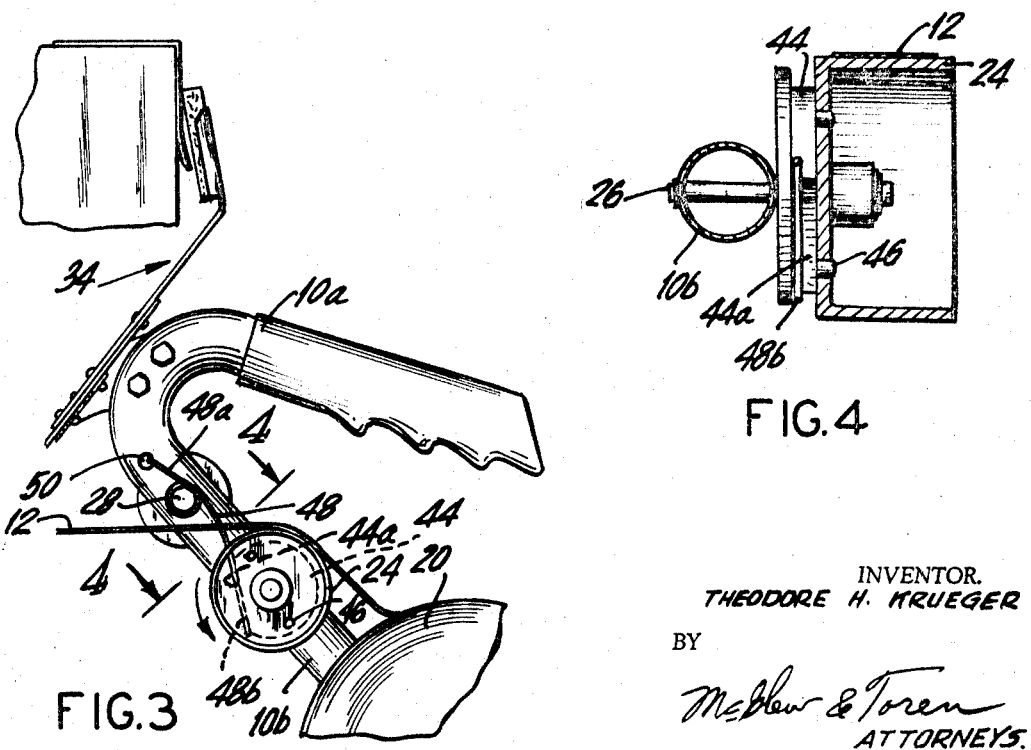
INVENTOR.
THEODORE H. KRUEGER
BY
Meblew & Toren
ATTORNEYS.

United States Patent Office 3,466,215
Patented Sept. 9, 1969

3,466,215
HAND TAPE DISPENSER TOOL
Theodore H. Krueger, Stratford, Conn., assignor to
Better Packages, Inc., Shelton, Conn.
Filed Oct. 21, 1966, Ser. No. 588,622
Int. Cl. B32b 31/18; B44c 7/00
U.S. Cl. 156—378                            4 Claims

ABSTRACT OF THE DISCLOSURE

A hand tool for dispensing a length of tape, particularly a tape of a type having a pressure sensitive adhesive on one side, includes a tubular member having a bend at one end which forms a handle and a straight end having a rotatable mounting for a roll of the tape. At the location of the bend of the tubular pipe at the juncture of the handle to the straight portion, there is mounted a serrated cutting knife. The knife is located so that the two members move through the plane of passage of the tape from the roll to a device onto which it is to be applied in order that the tape may be easily cut. A feature of the construction is the provision of a measuring roller over which the tape is fed from the roll as it is applied to an object. Associated with the roller is a detent which is effective to provide a resistance to the rotation of the roller after it is advanced by a predetermined amount during the feed-out of the tape over its surface. The resistance may be overcome by a slight feed-out pressure, if desired, but it does provide an indication of how much tape has been fed out.

---

This invention relates, in general, to the construction of tools for dispensing and applying tape and, in particular, to a new and useful hand tool particularly for applying a pressure sensitive tape which includes means for indicating when a predetermined length of tape has been paid out in order to facilitate the centering of such tape in respect to the ends or corners of a container and which also includes means for easily thereafter cutting the paid out length and for wiping the tape over the container to which it is applied.

The present invention is an improvement over the invention disclosed and claimed in Patent No. 3,185,363 issued to the present applicant inasmuch as it provides a tape applying tool with means for accurately measuring a dispensed quantity of tape in order to facilitate the application of this tape to containers. The measuring means is of simple design and provides a gauge for insuring that the tape will be applied substantially uniformly and symmetrically at the sides and corners of a container to be sealed. The device of the present invention is particularly applicable for the application of a pressure sensitive tape inasmuch as it includes a pay-out roller which will be pressure sensitively engaged by the pressure sensitive adhesive of the tape and will rotate as the tape is passed thereover as it is applied to a container. The rotation of the roller will proceed until there is an indication that a selected length of tape has been fed. The length is selected so that the tape may be symmetrically and easily applied to the container being sealed. The tool is designed to be used by withdrawing the end of the tape from a reel carried on the tool and positioning the tape end over the top wall of the container to be sealed and securing the preselected length to the top wall. The tool is then pulled away from the container to dispense a length which will be selected by the rotating measuring wheel to provide an additional feed-out which is sufficient to provide the same amount of tape for sealing the container side. The tool is then manipulated to bring a wiper over the tape on the side wall to seal the tape to the container along this wall.

The mechanism is very simple and inexpensive. The measuring wheel comprises nothing more than a wheel which will rotate and then stop after it has rotated a certain distance by engagement of a spring member on a flat of a cam surface. Additional rotation of the tape may be accomplished by exerting pressure to cause the wheel to rotate to bring the spring member off the flat surface. When the spring moves into the flat of the cam, it provides a strong resistance to further feeding and thus indicates that the selected tape length has been dispensed.

A further feature of the tool is that it is provided with an inexpensive cutting blade assembly which is mounted at the bend of the handle of the tool and which includes an angle blade which may be moved downwardly to provide for a progressive cut of the tape which extends outwardly from the container after an initial length is secured to the container. The cutter assembly also includes a wiper element which will be positioned directly in line with the tape after the cutting is complete and which may be moved downwardly against the tape to wipe it down against the wall of the container to secure it tightly into position.

Accordingly, it is an object of the invention to provide an improved hand tool for dispensing and applying a pressure sensitive tape which includes means for indicating when a predetermined selected length of tape is fed out.

A further object of the invention is to provide a hand tool for dispensing pressure sensitive tape which includes a simple handle element having a straight shaft portion having an end with means for rotatably supporting a roll of tape and which includes a roller over which the tape from the roll supply may be fed and which will rotate when the tape is dispensed off the roll to indicate such as by a detent engagement that a selected length of tape has been paid out and which further includes means for thereafter cutting the paid out length of tape and for wiping the tape onto a container which is about to be sealed.

A further object of the invention is to provide a hand tool for dispensing tape which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

FIG. 1 is a side perspective view of a tape dispensing and tape applying tool indicated in a working position in which a portion of the tape has been applied to a container constructed in accordance to the invention;

FIG. 2 is a left-hand perspective view of the tape dispenser indicated in FIG. 1;

FIG. 3 is a side elevational view showing the tool in a position for wiping the tape downwardly over the container;

FIG. 4 is a section taken along the line 4—4 of FIG. 3; and

FIG. 5 is a section taken along the line 5—5 of FIG. 2.

Referring to the drawings, in particular, the invention embodied therein comprises a tape dispensing tool generally designated 10 which is shown in FIG. 1 in a position in which it is held for applying a length of sealing tape 12 to a container 14.

In accordance with the invention, the tape dispensing tool 10 includes a curved handle portion 10a and a straight shank portion 10b. The shank portion 10b carries a reel supporting plate 16 having inturned plate portions 16a and 16b (FIG. 2) which extend through a cylindrical hard paper core 18 of a roll of pressure sensitive tape 20. The plate member is rotatably supported on the shank portion 10b on a pivot member 22.

In accordance with a feature of the invention, a combination measuring and guide roller 24 is rotatably mounted on a pivot member 26 on the shank portion 10b and when the tape 12 is to be fed from the roll 20, it is directed around a portion of the surface of the roller 24 and below a cylindrical guide member 28. A pin 30 holds the guide member 28 and a cylindrical distance piece 32 to the shank portion 10b.

The complete tool includes a combination knife and wiper assembly generally designated 34 which includes a knife plate 36 which is bolted to the curved portion 10a of the tool and a wiper portion 38 which is carried at the upper end of an angle member 40 which overlies the knife member 36.

As best indicated in FIG. 2, the knife member includes a blade 42 which is inclined in respect to the plane of the tape so that when the handle is moved downwardly across the tape as to effect the cutting thereof, the knife will effect point cutting across the tape.

With the improved tool 10, the forward end of the tape is positioned over the portion of the container to be sealed and pressed into sealing engagement with the top wall of the container 14. With the tape thus engaged on the container, the tool is moved backwardly away from the container to cause the pay-out of a further length of tape 12. As this tape is moved outwardly, it causes rotation of the measuring roller 24. In accordance with a further feature of the invention, the measuring roller 24 carries a cam disk 44 (FIG. 4) which is generally cylindrical but includes a flat portion 44a. The cam disk 44 is secured to the end of the roller 24 such as by rivets 46. A resilient detent member which comprises a resilient wire element generally designated 48 is wound around the pin 30 carrying the cylindrical guide 28 and is anchored at one end 48a into a recess 50 defined in the shank portion 10b. The opposite end 48b of the resilient member 48 is urged into engagement with the circumference of the cam plate 44. As the tool 10 is moved away from the container 14, the passage of the tape 12 in pressure engagement with the roller 24 will cause a rotation thereof to initially move the cam 44 against the biasing force of the spring 48 as it rides off the flat 44a. Rotation of the wheel 24 and pay-out of the tape 12 will continue until the cam disk 44 again moves to a position at which the resilient spring member 48 moves back on the flat 44a. This will produce a sufficient force to momentarily stop the easy feeding of the tape 12 so that the operator then knows that the uniform selected length of tape which is to be dispensed for sealing packages of this nature has been payed out.

Thus, with the tool constructed in accordance with the invention, it is a simple matter to effect sealing of cartons of various sizes with uniform lengths of tape which are dispensed in a manner such that the tape may always be symmetrically arranged both at the tops and sides of the container which is sealed. After half the total length of the tape is placed on the container 14 and sealed thereto an additional length of the tape is pulled off to an amount indicated by the measuring roller 24. Thereafter, it is merely necessary to move the handle through a plane at which it will intersect the tape 12 and cause the blade 42 to cut the tape. Thereafter, the motion is completed by orienting the handle so that the end of the wiper member 38 is oriented over the length of tape which has just been cut in order to wipe this length into engagement with a side wall of the container.

The hand tool is very inexpensive and it provides means for both storing the tape in a position in which it may be used and for readily applying a selected length of tape to a container or similar article as desired. It should also be appreciated that the means for measuring the length of tape dispensed will not prevent the feed-out of a further amount of tape but only provides a strong indication that the uniform length has been fed. Changes in this uniform length may, of course, be obtained by changing the size of the measuring roller 24 and/or its associated cam plate 44. It should be noted that the guide member 28 will not normally contact the top of the tape 12 as would appear from the showing of FIG. 2, unless the handle is inclined by an amount greater than that indicated in FIG. 2, as would be the case when the handle is moved so that the knife blade 42 is directed across the path of the tape 12 to sever it. In this latter instance, the bar 28 prevents the tape from rising upwardly to move off the measuring roller 24 during cutting.

While a specific embodiment of the invention has been shown and described in detail to illustrate the application of the inventive principles, it will be understood that the invention may be embodied otherwise without departing from such principles.

What is claimed is:

1. A hand tool for dispensing particularly a pressure sensitive sealing tape comprising, a bar member including a shank portion and a curved handle portion connected to one end of said shank portion, means adjacent the free end of said shank portion for rotatably supporting a roll of tape to be dispensed, a measuring roller rotatably mounted on said shank portion at a location at which it will be directly adjacent a roll of tape mounted on said tape roll mounting means, the tape which is fed off said roller being adapted to be passed over said measuring roller and engaged therewith as it is dispensed, a cam carried by said measuring roller including a flat, resilient means carried by said tool including a portion biased into engagement with the surface of said cam and providing a slight overcomeable resistance to rotation of said cam with said roller upon the resting of said resilient member on said flat to indicate when a selected length of tape has passed over said measuring roller, and a knife carried by said tool adjacent the intersection of said curved handle portion and said shank portion with a cutting blade disposed to overlie the tape being fed off said measuring roller, said handle being movable downwardly to cause the blade to move through the plane of movement of said tape and to sever said tape.

2. A hand tool for dispensing particularly a pressure sensitive sealing tape comprising, a bar member including a shank portion and a curved handle portion connected to one end of said shank portion, means adjacent the free end of said shank portion for rotatably supporting a roll of tape to be dispensed, a measuring roller rotatably mounted on said shank portion at a location at which it will be directly adjacent a roll of tape mounted on said tape roll mounting means, the tape which is fed off said roller being adapted to be passed over said measuring roller, a cam carried by said measuring roller including a flat, resilient means carried by said tool including a portion biased into engagement with the surface of said cam and providing a slight overcomeable resistance to rotation of said cam with said roller upon the resting of said resilient member on said flat, a knife carried by said tool adjacent the intersection of said curved handle portion of said shank portion with a cutting blade disposed to overlie the tape being fed off said measuring roller, said handle being movable downwardly to cause the blade to move through the plane of movement of said tape and to sever said tape, a guide member positioned on said shank portion and extending outwardly therefrom in a position closer to said curved handle portion than said handle roller, said guide providing a means for retaining the tape over said measuring roller when said handle is moved downwardly to cause the cutting of said tape by said knife blade.

3. A hand tool for dispensing particularly a pressure sensitive sealing tape comprising, a bar member including a shank portion and a curved handle portion connected to one end of said shank portion, means adjacent the free end of said shank portion for rotatably supporting a roll of tape to be dispensed, a measuring roller rotatably mounted on said shank portion at a location at which it will be directly adjacent a roll of tape mounted on said tape roll mounting means, the tape which is fed off said roller being adapted to be passed over said measuring roller, a cam carried by said measuring roller including a flat, resilient means carried by said tool including a portion biased into engagement with the surface of said cam and providing a slight overcomeable resistance to rotation of said cam with said roller upon the resting of said resilient member on said flat, a knife carried by said tool adjacent the intersection of said curved handle portion and said shank portion with a cutting blade disposed to overlie the tape being fed off said measuring roller, said handle being movable downwardly to cause the blade to move through the plane of movement of said tape and to sever said tape, and a wiper member projecting outwardly from said handle portion in a position to permit said handle portion to be moved downwardly to engage said wiper member with the tape to press the tape onto a container.

4. A hand tool for dispensing particularly a pressure sensitive sealing tape comprising, a bar member including a shank portion and a curved handle portion connected to one end of said shank portion, means at the free end of said shank portion for rotatably mounting a roll of tape to be dispensed, a measuring roller rotatably mounted on said shank portion adjacent said tape roll mounting means in a position so that the tape which is fed off said roller will be passed over said measuring roller, a cam disk carried adjacent one end of said measuring roller having a flat, a member on said shank portion including a resilient portion biased into engagement with the surface of said cam and providing a slight overcomeable resistance to rotation of said cam with said roller upon the resting of said resilient member on said flat, and a combination knife and wiper assembly carried by said tool adjacent the intersection of said curved handle portion and said shank portion with a wiper extending outwardly from one end and a cutting blade extending outwardly from an opposite end adjacent the junction of said shank and said handle portion in a location to overlie the tape being fed off said measuring roller, said handle being movable downwardly to cause the blade to move through the plane of movement of said tape and to sever said tape and downwardly further to engage the wiper over the tape.

References Cited

UNITED STATES PATENTS

| | | | |
|---|---|---|---|
| 2,654,154 | 10/1953 | Krueger | 225—12 |
| 3,131,109 | 4/1964 | Auld et al. | 156—579 |
| 3,273,772 | 9/1966 | Nakajima et al. | 225—12 |
| 3,318,753 | 5/1967 | Whitlow | 156—579 |

HAROLD ANSHER, Primary Examiner

W. E. HOAG, Assistant Examiner

U.S. Cl. X.R.

33—132; 156—527, 577, 579; 225—12, 66